(12) United States Patent
Shivashankar et al.

(10) Patent No.: US 6,889,410 B2
(45) Date of Patent: May 10, 2005

(54) RAPID COATING PROCESS AND ITS APPLICATION TO LEAD-ACID BATTERIES

(75) Inventors: Srinivasarao Shivashankar, Bangalore (IN); Ashok Kumar Shukla, Bangalore (IN); Anil Uttam Mane, Pune (IN); Bellie Hariprakash, The Nilgiris (IN); Shaik Abdul Gaffoor, Hyderabad (IN)

(73) Assignee: Indian Institute of Science, Bangalore (IN)

( * ) Notice: Subject to any disclaimer, the term of this patent is extended or adjusted under 35 U.S.C. 154(b) by 36 days.

(21) Appl. No.: 10/355,289

(22) Filed: Jan. 31, 2003

(65) Prior Publication Data

US 2004/0151982 A1 Aug. 5, 2004

(51) Int. Cl.⁷ .......................... H01M 4/82; H01M 4/68; B23P 13/00; B05D 5/12
(52) U.S. Cl. .......................................... 29/2; 29/623.5
(58) Field of Search .................... 29/2, 623.5; 427/532, 427/553, 554, 559

(56) References Cited

U.S. PATENT DOCUMENTS

| | | | |
|---|---|---|---|
| 3,929,513 A | * 12/1975 | Mao | 148/538 |
| 4,221,854 A | 9/1980 | Hammar et al. | |
| 4,617,206 A | * 10/1986 | Haisma et al. | 427/374.1 |
| 4,713,306 A | 12/1987 | Pinsky et al. | |
| 4,822,641 A | * 4/1989 | Weik | 427/250 |
| 5,059,448 A | * 10/1991 | Chandra et al. | 427/557 |
| 5,318,800 A | * 6/1994 | Gong et al. | 427/229 |
| 5,334,464 A | * 8/1994 | Rowlette | 429/210 |
| 5,643,696 A | 7/1997 | Rowlette | |
| 6,232,017 B1 | 5/2001 | Tsuchida et al. | |
| 6,316,148 B1 | 11/2001 | Timmons et al. | |

FOREIGN PATENT DOCUMENTS

| | | | | |
|---|---|---|---|---|
| JP | 62260064 A | * 11/1987 | | C23C/16/40 |
| JP | 07142468 A | * 6/1995 | | H01L/21/316 |

OTHER PUBLICATIONS

Kaplan et al. "STM and XPS study of filtered cathodic vacuum arc deposited Sn–O films", Thin Solid Films 290–291, 1996, pp. 355–361.*

Kurisawa et al., "Development of positive electrodes with $SnO_2$ coating by applying a sputtering technique for lead–acid batteries", Published in the Journal of Power Sources 95 (2001), pp. 125–129.

* cited by examiner

Primary Examiner—Gregg Cantelmo
(74) Attorney, Agent, or Firm—Narendra R Thappeta (57) ABSTRACT

A precursor chemical compound is applied to a surface sought to be coated, and subjected to a rapid thermally activated chemical reaction process (RTACRP) in which the temperature is quickly raised and lowered. The desired coating is formed from the precursor chemical compound by a chemical reaction at the elevated temperature. The structural/chemical integrity of the surface is preserved due to the use of RTACRP. The approach may be used to manufacture a high-energy density lead-acid battery.

17 Claims, 5 Drawing Sheets

RAPID COATING PROCESS AND ITS APPLICATION TO LEAD-ACID BATTERIES

BACKGROUND OF THE INVENTION

1. Field of the Invention

The present invention relates to producing protective coatings on surfaces, and to manufacturing products such as lightweight lead-acid batteries therefrom.

2. Related Art

A coating generally refers to a relatively thin layer of a material that is deposited/laid on a relatively thick piece (usually) of a different material (often referred to as the substrate) in such a way that the coating adheres well to the substrate. Common examples include, but not limited to, coating of steel with oxides such as aluminum oxide for protection against corrosion and coating of aircraft components with thermal barrier materials such as zirconium oxide. Coatings may be relatively thick i.e., tens of micrometers in thickness, or relatively thin i.e., a few micrometers in thickness or even less. Aluminum oxide coating and zirconium oxide coating, noted above, respectively represent a relatively thin coating and a relatively thick coating.

A number of techniques have been developed to deposit coatings of a wide range of materials—metals, metal compounds (including oxides and nitrides), semiconductors, insulators, and polymers. These may be broadly classified as (a) physical and (b) chemical techniques. The physical techniques include thermal and e-beam evaporation, dc/rf/magnetron sputtering, ion plating, cathode arc deposition, and plasma spraying. Electrochemical deposition, chemical vapor deposition, dip coating, and spray pyrolysis are some of the chemical techniques for coating formation.

The physical and chemical techniques noted above are generally employed in industry for the manufacture of a variety of goods and articles in common use. In many of these methods, the substrate to be coated is maintained at ordinary room temperature, enabling the coatings to be applied to even those substrates (such as organic polymers), which cannot usually withstand high temperatures. However, chemical methods (save electrochemical deposition) require that the substrate be raised to an elevated temperature in order that chemical reactions that lead to the formation of the desired coating occur at a rate high enough to be practically and economically viable. Indeed, as is well known, at least some chemical reactions do not take place at a measurable rate unless the temperature is sufficiently high.

In general, the rate of deposition of coatings (measured, say, in micrometers per hour) through physical methods is lower than through chemical methods. An exception is the plasma spray method, in which the temperature of the surface to be coated is raised to high levels (thousands of degrees Celsius) at the points of coating. The high temperature enables the coating to be carried out at a high rate and aids the adherence of the coating to the substrate. However, such a process may be unsuitable for substrates with low melting points.

Thus, it may be appreciated that chemical methods (and the aforementioned physical method) offer higher deposition rates, but generally require temperatures which may be too high for certain applications. Accordingly, it is desirable to have a coating method that offers the advantages (e.g., high rate and cost-effective deposition) of chemical methods, but yet leaves the substrate intact at the end of the process, despite the elevation of temperature that might be necessary.

Such a coating process may be desirable in manufacturing several types of devices. An example of such a device is a lead-acid battery, with enhanced energy density, as described below.

A battery refers to a device which stores electrical energy such that the energy is available at desired times on demand. Batteries typically contain two electrodes, i.e., an anode (negative plate) and a cathode (positive plate) placed in an electrolyte. Electrical energy is generally obtained from a battery as and when desired by connecting the electrical appliance to be operated to its negative and positive plates, as is well known in the relevant arts.

Lead-acid batteries are in widespread use in several places such as automobiles, boats, airplanes, and for emergency power supply (uninterrupted power supply). In one conventional design, the negative and positive plates/grids of lead-acid batteries are implemented using lead alloys having lead in abundant proportions (including pure lead). At these electrodes, a primary role of lead/lead alloy is to provide a path for electrical conduction during battery charging and discharging.

Although lead alloys are not generally as good electrical conductors as metals such as copper, they are often preferred over other metals due to the stability they provide during battery charging and discharging, and their relatively low cost. Specifically, lead/lead alloys are typically able to withstand appreciably the highly corrosive environment created by the acid electrolyte. Metals more conductive than lead are either quickly corroded in acids (e.g., aluminium, copper) or too expensive to be commercially viable (e.g., platinum).

In lead-acid batteries, the framework of a battery plate that supports the active material and also serves as the current collector is referred to as the "grid". In the battery terminology, the plate is also called an electrode. By definition, the electrode is an electronic conductor, which acts as a source or a sink of electrons involved in electrochemical reactions taking place in such a battery.

While plates/grids made of lead/lead alloys are reasonably stable in the acidic environment of the lead-acid battery, they are nevertheless corroded during the normal operation of the battery, limiting the lifetime of such a battery. It is thus desirable to provide protection against such corrosion, so as to enhance the durability of lead-acid batteries.

Furthermore, due to the high mass-density of lead (11.3 grams per cubic centimeter), lead-acid batteries are usually heavy. It is often desirable that batteries store high energy, but weigh less. Accordingly, a metric referred to as energy density, which is measured by the number of watt-hours (Wh) of energy stored in a battery per kilogram weight (kg) of the battery (abbreviated as Wh/kg), is often used to measure the efficacy or desirability of a battery. Thus, it is generally desirable to provide batteries with high-energy density.

For example, electric vehicles (EVs) for neighborhood applications such as hospitals, industrial parks, holiday resorts, residential communities, and city centers require batteries with high-energy density because, otherwise, the traction of the heavy batteries would in itself consume a sizeable fraction of the stored energy of the batteries. It is estimated that, for such applications, batteries with energy density of 40–50 Wh/kg would be more appropriate.

By contrast, many lead-acid batteries currently available in the market have energy density of about 30 Wh/kg. High-energy density batteries are generally important also in portable power applications, e.g., airborne systems, in which the weight of each component/sub-system is typically at a premium. High-energy density lead-acid batteries would also be advantageous in conventional automobiles with internal combustion engines, as well as in hybrid EVs, where fuel efficiency would be marginally enhanced when batteries are lighter.

In attempting to achieve a significant reduction in the total weight of a lead-acid battery (without reducing the amount of energy stored), an effective approach, therefore, would be to reduce the weight of the plates/grids constituting the electrodes of the battery. This may be accomplished by replacing the electrode structure made entirely of lead/lead alloy with a structure that uses a lightweight material, which merely acts as a physical support (substrate), and is covered by a relatively thin lead alloy layer (or laminate) that performs the charge/discharge functions of the battery.

The use of such a composite structure for the battery plate/grid, instead of a relatively thick plate made entirely of lead alloy, can result in a significant reduction in the total weight of each plate/grid. A corresponding increase in the energy density of the lead-acid battery then ensues. However, the use of a relatively thin layer of lead increases the need for its protection against corrosion in the strong acid environment of the lead-acid battery. Some of such example approaches are briefly described below.

For example, U.S. Pat. No. 4,221,854, entitled, "Lightweight laminated grid for lead-acid storage batteries", issued to Hammar et al. (hereafter Hammar) describes a lead-acid battery in which a grid/plate comprises a substrate made of a polymer (such as polyvinychloride) laminated with a thin lead/lead alloy foil. This combination reduces the weight of the battery plate/grid, contributing to an increase in the energy density of the battery. However, Hammar does not appear to describe a corrosion resistant coating (and/or a process for forming the same on the substrate). As a result, the plate/grids of Hammar may be subsceptible to corrosion in acid electrolytes, thereby limiting the durability of the corresponding batteries.

U.S. Pat. No. 4,713,306, entitled, "Battery Element and Battery Incorporating Doped Tin Oxide Coated Substrate" issued to Pinsky et al (hereafter "Pinsky") describes a battery element useful as at least a portion (which appears to mean the grid) of the positive plate coated with electrically conductive doped tin oxide. The tin oxide coating does not appear to be meant to provide protection to the grid against acid corrosion since the grid made of glass fibre is inherently resistant to acid corrosion.

U.S. Pat. No. 5,643,696, entitled, "Battery plates with lightweight cores" issued to Rowlette describes battery plates/grids made of metallic substrates (aluminum or titanium or their alloys) coated with lead/lead alloy. These metallic substrates may still have unacceptably high mass density (e.g., aluminum has an approximate mass density of 2.7 grams cm−3). Accordingly, it may be desirable to produce batteries using substrates made of materials having an even lower mass density.

Another example approach is described in U.S. Pat. No. 6,232,017, entitled "Grid for lead-acid battery", issued to Tsuchida et al (hereafter "Tsuchida"), in which polyamide and glass fibers are used to construct a composite battery plate/grid. The weight of the grid is reduced, in comparison with conventional grids made entirely of lead/lead alloys, by using the low density of polyamide to form a support structure, and a glass fiber sheet coated by a thin layer of lead/alloy to form the electricity-collecting part of the battery plate/grid. However, a corrosion resistant coating of the plates/grids appears to be absent in Tsuchida, just as it is absent in Hammar, thereby making the embodiments susceptible to acid corrosion.

In the U.S. Pat. No. 6,316,148, entitled, "Foil-encapsulated, lightweight, high-energy electrodes for lead-acid batteries", Timmons et al (hereafter Timmons) describe another approach to reduce the weight of lead-acid batteries. The electrodes are made of non-lead substrates (such as aluminum) encapsulated by thin sheets of conductive foils of lead/lead alloy, which conduct electricity. The foils, being corrosion-resistant, protect the substrate from acid corrosion. The weight of the battery is reduced by the use of non-lead substrates with mass density no greater than 70% of the mass density of lead. However, Timmons also appears to suffer from the same inadequacies of Hammar and Tsuchida in that a corrosion-resistant coating of the plate/grid appears to be absent.

In addition to providing high-energy density, it may be desirable to produce batteries meeting several other requirements. For example, it may be desirable to use cost-effective material for the substrates to reduce the overall cost of producing batteries. The overall manufacturing technology may further need to allow thin coatings of lead alloy on such a cost-effective and lightweight (low mass density) substrate material. The technology may further need to allow corrosion resistant coatings to be applied to the plates/grids, in order to enhance the durability of the resulting lead-acid batteries.

One problem with the use of a low cost material, which also has a low mass density as the substrate is that the melting point of such a material may be low, making it incompatible with several technologies employed in the manufacture of lead-acid batteries. Similar incompatibility may also exist when applying a corrosion resistant (yet with a sufficiently good electrical conductivity) coating on the lead alloy layer.

For example, the formation of such a corrosion-resistant coating (as that of tin oxide) on the lead/lead alloy layer of the battery plate/grid usually requires a temperature significantly higher than 327° C., the melting point of lead. (The melting point of lead alloys usually employed in lead-acid batteries is lower than 327° C.) In particular, the formation of a tin oxide layer by the simple and convenient "dip coating" method requires calcination at a temperature in the range 450–600° C., as described in the article entitled, "Development of positive electrodes with $SnO_2$ coating by applying a sputtering technique for lead-acid batteries", by Kurisawa et al., published in the Journal of Power Sources 95 (2001) pp. 125–129 (hereafter "Kurisawa").

Accordingly, it is stated in the abstract of Kurisawa that, " . . . it is impossible to apply this (dip coating) method to a Pb (lead) substrate . . . ", appearing to imply that the calcination temperature required to form the protective tin oxide layer in this method is incompatible with the lead/lead alloy plate/grid.

Attempts have therefore been made by Kurisawa to use coating technologies that employ low temperatures. For example, Kurisawa describes using vacuum-based thin film technology to form protective $SnO_2$ coatings on lead grids. In such a coating process, the temperature of the lead grid to be coated does not exceed approximately 120° C. Specifically, Kurisawa teaches using the radio frequency (RF) sputtering technique to deposit a 15 micrometer thick $SnO_2$ coating onto a 500 micrometer-thick lead plate. Such a protective coating of $SnO_2$, on the relatively thin lead plate/grid, has been shown in Kurisawa to be effective in reducing positive plate/grid corrosion in lead-acid batteries and in improving the energy density of the batteries thereby.

However, sputtering is generally a slow process (e.g., Kurisawa indicates a rate of 0.4 micrometer/hour), which may require that the substrate (along with the lead alloy coating) be subjected to ambient temperatures (e.g., 120° C. in Kurisawa) for many hours. The prolonged exposure to such ambient temperatures may compromise the mechanical integrity of the plates/grids having low melting points, even if the ambient temperatures are lower than the melting point of the materials forming the substrate and the coatings.

Furthermore, as sputtering is generally a line-of-sight deposition process, both sides of an electrode (plate/grid) cannot be coated in a single step, unless complex and expensive sputtering apparatus is employed. The cost of forming a corrosion-resistant coating on a battery plate/grid by such a sputtering process is likely to be high, which may not be acceptable in several applications.

Therefore, what is also required is a process, which allows the corrosion-resistant oxide coating of lead/lead alloy layers to be formed on battery plates/grids constructed from a lightweight, inexpensive material, usually having a low melting point. Such plates/grids may then be used to fabricate lead-acid batteries, which would have a higher energy density and a longer lifetime than the conventional lead-acid batteries.

SUMMARY OF THE INVENTION

An embodiment of a grid structure (used in a lead-acid battery) may contain a substrate made from a material having a mass density of less than 2.5 grams cm−3, and a melting point lower than 300 degrees Celsius. A metal layer may be deposited on the substrate. A lead/lead alloy layer may be deposited on the metal layer, wherein the metal layer supports adhesion of said lead/lead alloy layer. An electrically conductive and corrosion-resistant layer provides corrosion protection for the lead/lead alloy layer. Due to the low mass density of the substrate, a high-energy density may be obtained.

In an embodiment, the substrate is made of a suitable plastic polymer. The embodiment may be implemented with the metal layer being not more than 10 micrometers in thickness, the lead/lead alloy layer being not more than 100 micrometers in thickness, and the protective layer being not more than 15 micrometers in thickness. The electrically conductive and corrosion-resistant layer may contain SnOx, wherein x represents a number between 1 and 2.0.

A method according to another aspect of the present invention enables a grid structure to be manufactured. The method may contain coating a substrate with a metal compound, wherein the substrate is previously coated with a metal layer and a lead/lead alloy layer, and wherein the substrate is made of material having a low melting point. The substrate is then subjected to a rapid thermally activated chemical reaction process (RTACRP) in which temperature is raised and lowered quickly in a short duration to form an electrically conducting and corrosion-resistant metal compound layer on the lead/lead alloy layer.

Due to the quick raising and lowering of the temperature, the rapid thermally activated chemical reaction process does not affect the chemical/mechanical integrity of the totality of the plate/grid structure and, specifically, that of the substrate made of material having a low melting point.

The metal compound may be provided in the form of a solution or a slurry. In an embodiment, the metal compound comprises tin, and the protective layer comprises tin oxide.

The RTACRP may be implemented using one a set of halogen lamps, using a suitable furnace or using a laser beam.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

An aspect of the present invention enables high rate of deposition using a chemical process without compromising the structural integrity of a surface to be coated, even if the surface has low melting point. Such an result is achieved by applying a precursor chemical compound to the surface and subjecting the coated surface to a rapid thermally activated chemical reaction process, in which the ambient temperature is raised (to a high value or level) and lowered quickly. Due to the high ambient temperature, the desired chemical reaction may occur to form a coating derived from the precursor compound. Due to the quick raising and lowering of the temperature, the structural integrity of the underlying surface is not compromised. Such an approach may be used to coat a variety of surfaces.

Another aspect of the present invention provides a plate/grid structure used in a lead-acid battery. Such a plate/grid structure may be implemented using the approach(es) described in the previous paragraph. The plate/grid structure may contain four layers: substrate, metal layer, lead layer and a fourth layer which is electrically conductive and corrosion-resistant. The substrate is formed with a material of low density and low melting point, which acts as the base on which other layers are deposited. The metal layer is chosen to operate as a seed layer for the deposition of a layer of lead as the next layer in addition to providing adhesive support for the lead layer. Lead layer (formed by pure lead or alloys of lead) provides the electrical path for charge/discharge of the battery. The fourth layer, which is electrically conducting, operates also as a protective layer against corrosion of the underlying lead layer.

Due to the use of a low-density material for the substrate, the weight of each plate/grid is reduced (leading to a corresponding increase in the energy density of the lead-acid battery). By choosing a low-melting point material for the substrate (e.g., plastic polymer), its cost can be reduced, which makes the battery less expensive. As the plates/grids are of low weight, the battery container, which encloses and supports them may also be made lighter, leading to further increase in the energy density of the lead-acid battery.

The description is continued with reference to an example grid/plate structure, which can be implemented according to an aspect of the present invention. Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, the details of well-known structures or operations are not shown so as to avoid obscuring the invention.

2. Grid/Plate Structure

Figure 1A:
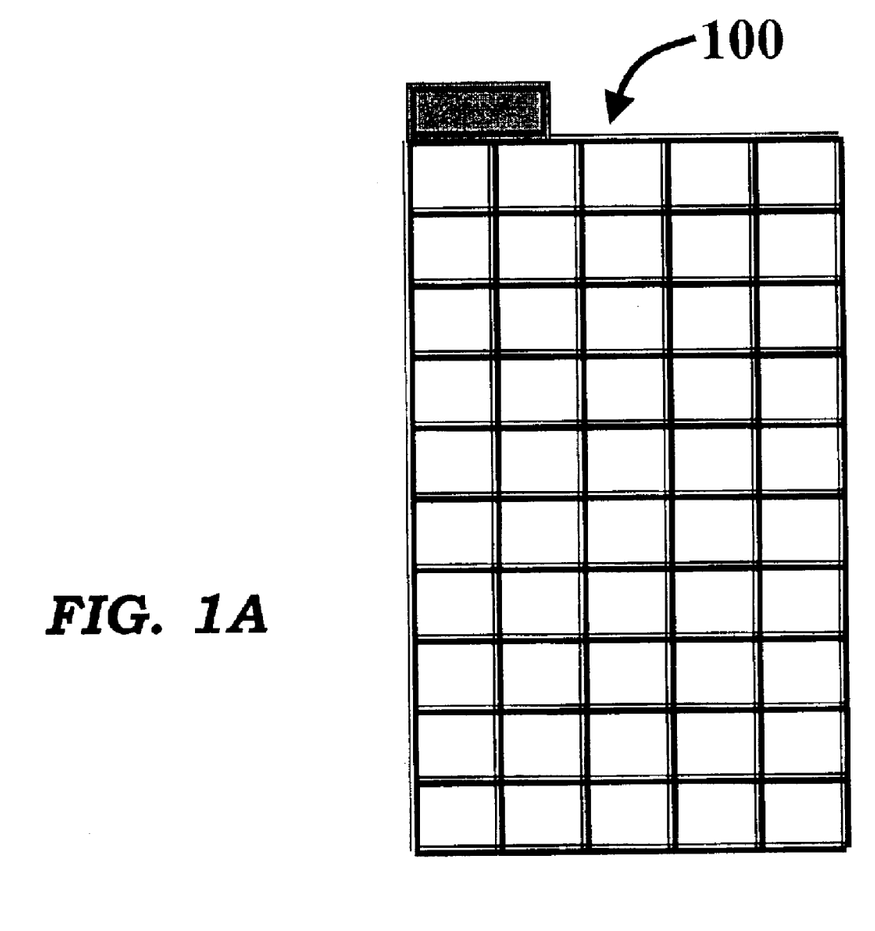
FIGS. 1A and 1B are diagrams illustrating the details of grid/plate structure in an embodiment of the present invention.
Figure 1B:
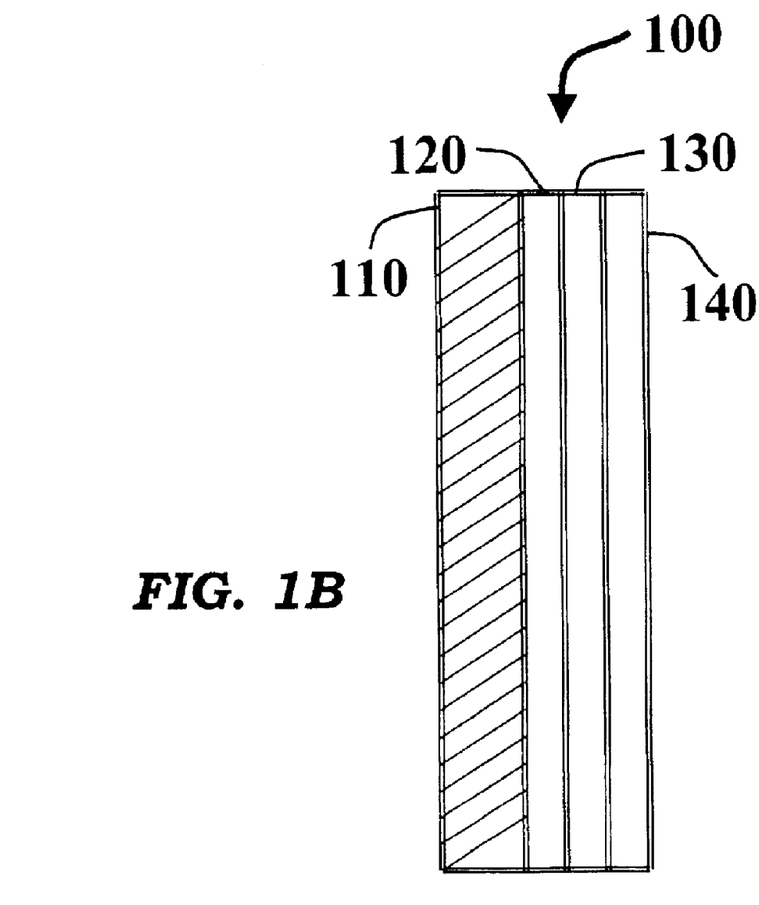

FIGS. 1A and 1B are diagrams illustrating the details of grid/plate structure 100 in an embodiment of the present invention. FIG. 1A is a diagram illustrating the details of front view of plate/grid structure 100. Different layers forming the plate/grid with low mass density are described below with reference to FIG. 1B. Grid/plate structure 100 is shown containing substrate 110, metal layer 120, lead layer 130 and protective, corrosion-resistant layer 140. Each layer is described below in further detail.

Substrate 110, formed from material with a low mass-density and a low melting point, constitutes the core of a plate/grid on which other layers are deposited. As noted above, the low mass-density and low melting point enable high-energy density lead-acid batteries to be implemented at a low cost. In an embodiment, substrate 110 is implemented using acrylonitrile butadiene styrene (ABS) polymer (plastic). Other types of polymers can be used for substrate 110. The generally flexible nature of plastics makes substrate 110 tolerant to mechanical stress. In addition, as polymer plastics such as ABS are not subject to corrosion even in the concentrated sulfuric acid present in lead-acid batteries, substrate 110 may be further suitable to lead-acid batteries.

Metal layer 120 may be formed by a low cost metal such as copper or nickel, even though more expensive metals such as gold can also be used when applications so require. Metal layer 120 may be deposited so as to have the desired thickness (generally less than 10 micrometers). Metal layer 120 operates as a seed layer for the deposition of lead/lead alloy layer 130, while also providing adhesive support to it.

Lead/lead alloy layer 130 may be formed by a thin layer of lead or a lead alloy (e.g., lead-tin alloy) deposited onto metal layer 120. As lead is a high-density material, it may be desirable to keep the lead (or lead alloy) layer appropriately thin to obtain a high-energy density in the resulting lead-acid battery. As is well known in the relevant arts, lead (or lead alloy) layers provide electrical conduction path for charge/discharge of the battery.

Protective layer 140 represents an example of an electrically conductive and corrosion-resistant layer (for example, tin oxide) deposited onto lead/lead alloy layer 130 to protect the plate/grid from chemical corrosion. Protective layer 140 may be made of any electrically conducting, corrosion-resistant oxide, including, but not limited to, binary oxides, such as, tin oxide (SnOx, where $1<=x<=2$, but not excluding non-stoichiometric $SnO_2$, wherein '<=' represents the logical relationship of less than or equal to), titanium dioxide ($TiO_2$), iridium oxide ($IrO_2$), ruthenium oxide ($RuO_2$), or ternary conducting oxides. Layer 140 may also be formed by an electrically conducting, corrosion-resistant, non-oxide material such as titanium nitride (TiN).

As noted in the background section above, the deposition of these protective layers may present challenges if low melting point material(s) is (are) present in the underlying layers/substrate. The manner in which such concerns may be addressed is described with reference to an example manufacturing process.

3. Manufacturing Plates/Grids for Lead-Acid Batteries

Figure 2:
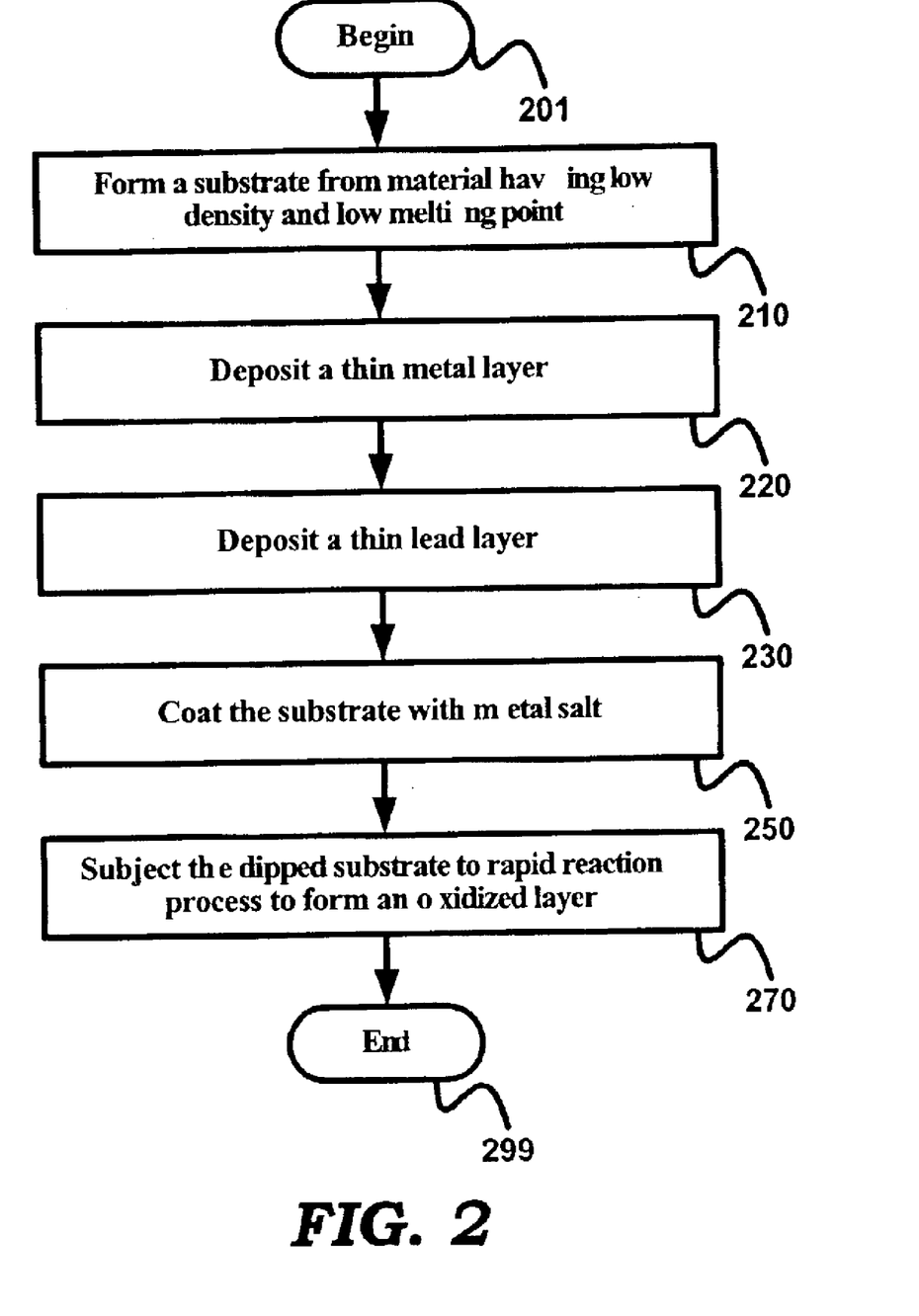
FIG. 2 is a flowchart illustrating the method of fabricating the grids used in a battery according to an aspect of the present invention.

FIG. 2 is a flowchart illustrating a process for fabricating plates/grids according to an aspect of the present invention. The method is described with reference to FIGS. 1A and 1B for illustration. However, the method can be implemented in several other embodiments as will be apparent to one skilled in the relevant arts based on the disclosure provided herein. The method begins in step 201 in which control passes to step 210.

In step 210, a substrate is formed from a material of low mass-density and low melting point. Several well-known methods can be used to form the substrate. For example, injection molding may be used to form substrate 110 from the ABS (acrylonitrile butadiene styrene) plastic. In the alternative, a stamping process may be used to form substrate 110 from a glass fiber-reinforced plastic.

In step 220, a thin metal layer is deposited onto substrate 110 to provide support for, and to enable, the deposition of the next lead/lead alloy layer. For example, copper may be used to form this thin metal layer, as it is inexpensive. One of several well-known approaches can be used to form the copper layer on substrate. For illustration, electroless plating process may be used to deposit copper layer on substrate 110. While electroless plating provides an inexpensive approach, more expensive techniques such as vapor deposition process may also be used. The thin metal layer corresponding to metal layer 120 of FIG. 1B ensures sufficient adhesion of the next lead layer to the substrate.

In step 230, a thin lead/lead alloy layer is deposited on to the thin metal layer to form the generally required electrical conduction path of lead-acid batteries. The thin lead/lead alloy layer may be formed by an electroplating process. Steps 250 and 270 can be used to deposit a protective layer, which prevents corrosion of the underlying layers 120 and 130.

In step 250, a coating of a suitable metal compound is applied to the structure resulting from step 230. In general, the metal compound needs to be chosen such that the layer resulting from the rapid thermally activated chemical reaction process of step 270 forms an electrically conductive and corrosion-resistant layer. Such a layer (coating) may be applied using several approaches and needs to be consistent with the physical form in which the metal compound is present.

For example, to deposit a tin oxide layer, a solution (or slurry) of tin chloride in an alcohol may be used and the structure may be dipped in the solution (slurry). Such a dip-coating process generally covers the entire grid surface in a single step. Alternatively, the solution may be sprayed in such a way that the entire grid is covered by the solution. On the other hand, if the metal salt is present in the form of powder, the coating of the grid may be achieved by spraying the powder on the structure using suitable equipment.

In step 270, the structure coated with the metal compound subjected to rapid thermally activated chemical reaction process to form the desired electrically conductive and corrosion-resistant layer. As is well known, rapid thermal processing (RTP) refers to a process in which the temperature of an object is raised and lowered quickly typically to remove any physical damage caused to the object in prior manufacturing steps. The concept of RTP is extended in this invention to accomplish chemical reactions, which usually require exposing an object to elevated temperatures.

Thus, according to an aspect of the present invention, the substrate resulting from step 250, is exposed to a chemically reactive ambient in which the temperate is raised and lowered very rapidly. As the temperature is lowered quickly, the structural integrity of the underlying substrate with low melting point is unaffected. At the same time, the integrity of the underlying lead alloy is also retained. However, due to the high temperature attained, the chemical reactions leading to the formation of desired chemical compound, i.e., a corrosion-resistant, yet electrically conducting layer on the structure resulting from step 250.

In one embodiment, the structure of step 250 is placed in a furnace in which the temperature is raised quickly (for example, at a rate of 10–50° C. per second) in an oxygen-containing (e.g., normal air) ambient. Such an approach results in a thin layer of metal oxide (e.g., SnOx, where 1<=x<=2, but not excluding non-stoichiometric SnO2) without melting any of the other layers formed in steps 210 to 250.

In another embodiment, halogen lamps of desired power are used for rapid heating through radiation. In such a case, the protective layer (e.g., SnOx) may be formed by heating a dip-coated plate/grid rapidly by turning on the halogen lamps for the required duration (for example, 10 seconds). In yet another alternative approach, rapid heating may be achieved through a laser beam. Steps 250 and 270 may be repeated several times to obtain desired thickness of the protective layer.

In general, steps 250 and 270 may not be necessary for fabricating the negative plate/grid, as negative plate/grid of a lead-acid battery is less vulnerable to chemical corrosion. However, for ease of manufacturing process, fabrication of the negative grid may be identical to that of positive grid as illustrated above.

It may be appreciated that steps 250 and 270 may involve simple processes that may be carried out using inexpensive equipment. The combination of steps 250 and 270 enables the use of lightweight plastic substrate and a thin layer of lead layer 130 (of FIG. 1B), resulting in a substantial reduction of the weight of plates/grids and thus the weight of lead-acid batteries. The method ends in step 299.

The manner in which lightweight plates/grids thus manufactured are assembled to provide a lead-acid battery is described below with reference to FIG. 3.

4. Lead-Acid Battery

Figure 3:
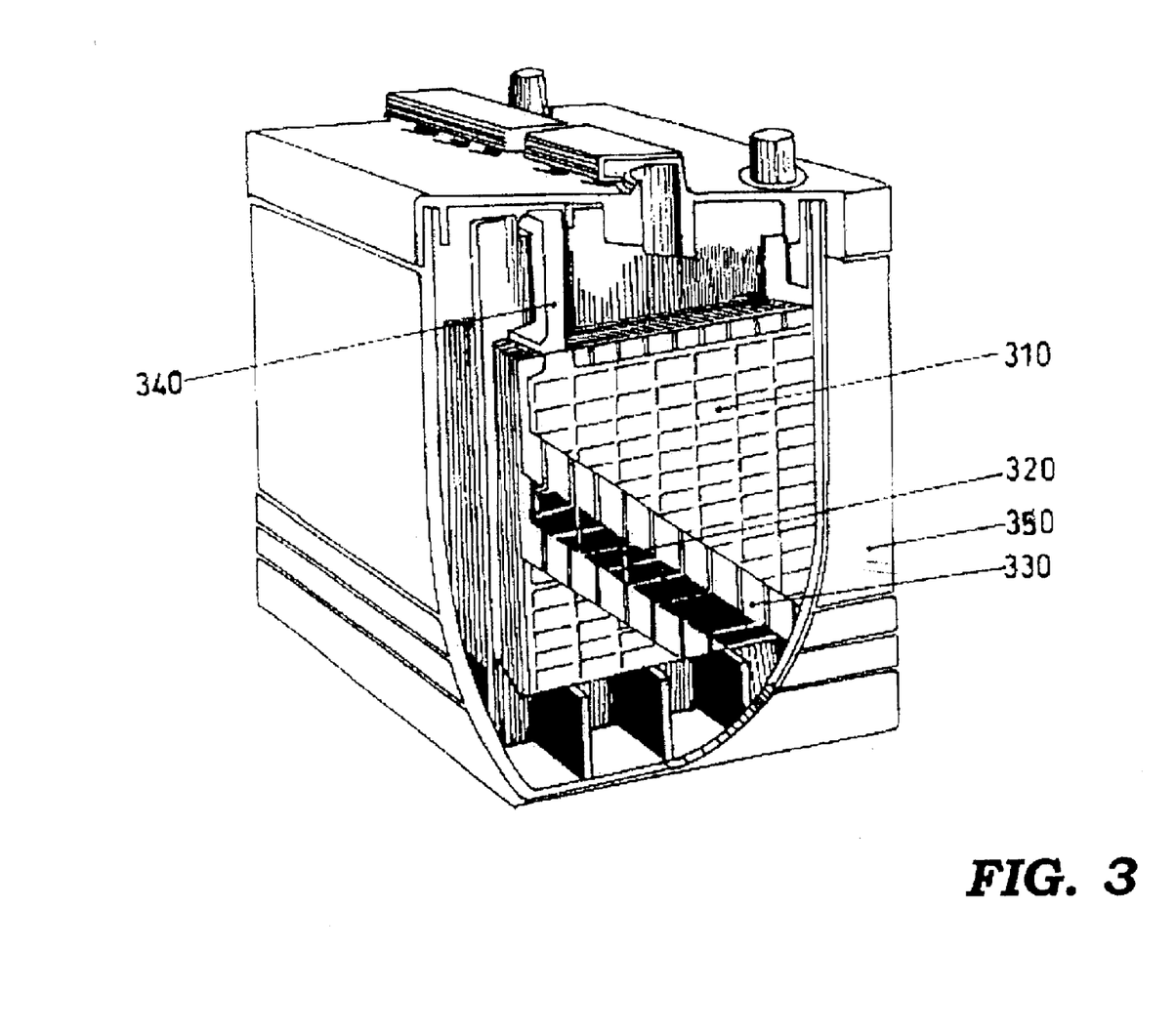
FIG. 3 is an example model illustrating the details of lead-acid batteries in an embodiment of the present invention.

FIG. 3 is a diagram illustrating the details of a lead-acid battery implemented according to an aspect of the present invention. Battery 300 is shown containing plates/grids 310 and 320, absorbent glass mat 330, lug 340 and container 350. Each component is described below.

Each of plates/grids 310 and 320 may contain multiple units of plate/grids formed as illustrated in FIG. 2, depending on the amount of energy to be stored and delivered at a desired battery voltage. Plates 310 and 320 may be formed in a known way, for example, by applying lead oxide paste followed by curing. One of the two plates/grids 310 and 320 may be implemented as a negative plate and another as a positive plate, in a known way (based on units of plate/grid 100). Electrolyte and active paste may also be applied between a plurality of plates/grids 310 and 320 in a known way.

Absorbent glass mat 330 separates plates/grids 310 and 320 from each other. Lug 340 connects the plate straps and may be implemented using light weight material because lug 340 needs only to support low-weight plates/grids provided, using various aspects of the present invention.

Container 350 generally needs to be made with a strong, leak-proof, and corrosion-resistant material. Container 350 may also be made of low mass density material to further reduce the weight of battery 300. Thus, various aspects of the present invention enable lead-acid batteries with high-energy density and long life to be provided at low cost.

While several aspects of the present invention are described above with reference to lead-acid batteries for illustration, it should be understood that the present invention can be used to manufacture other types of devices, wherein high ambient temperatures are required (e.g., to ensure that the desired chemical reaction occurs at a desired high deposition rate) and prolonged exposure to high temperatures is undesirable (e.g, due to compromise in structural/chemical integrity by such prolonged exposure). The corresponding method is summarized below.

5. Method

Figure 4:
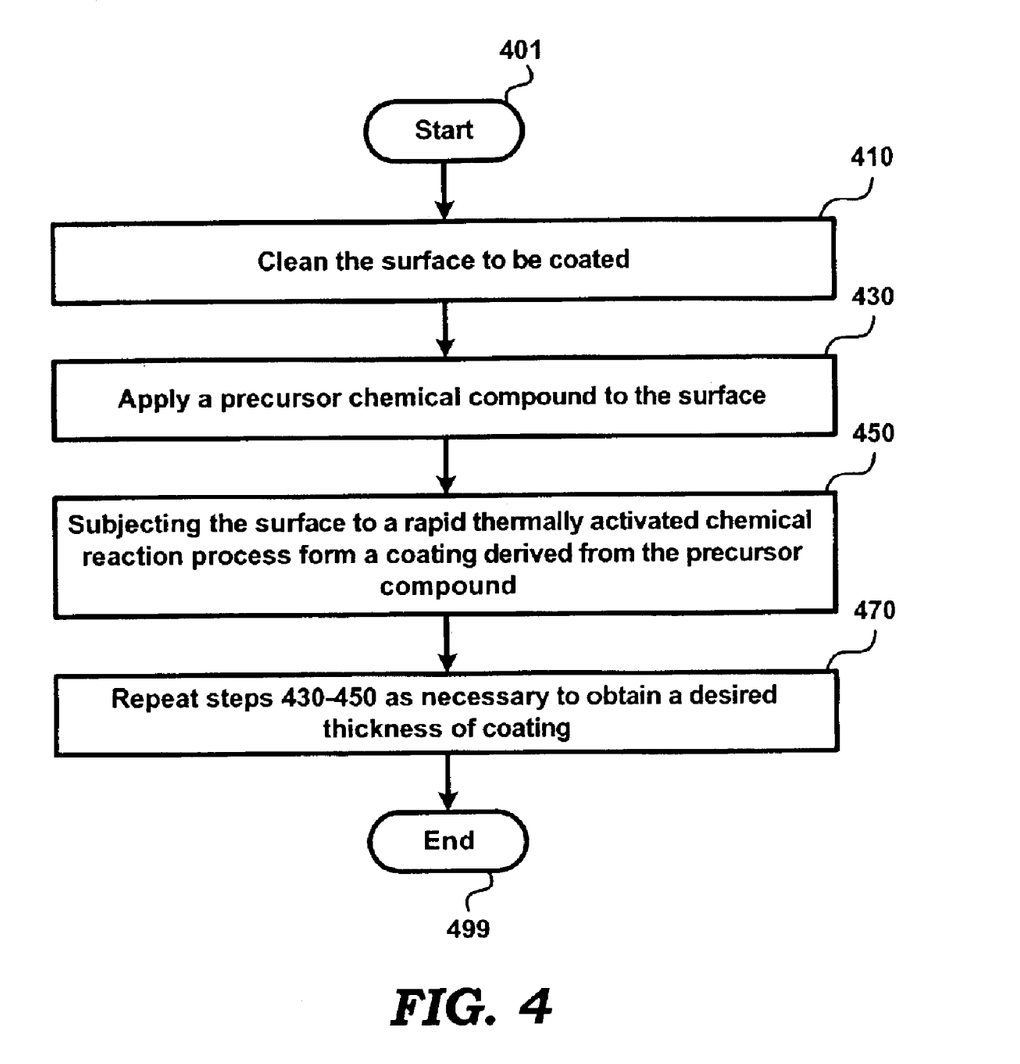
FIG. 4 is a flowchart illustrating a general approach for attaining a chemical reaction without compromising the integrity of surfaces to be coated.

FIG. 4 is a flowchart illustrating a method using which rapid deposition of a desired coating can be obtained on a surface according to an aspect of the present invention. The method begins in step 401, in which control passes to step 410.

In step 410, the surface to be coated is cleaned. In general, the cleaning depends on the surface and/or the environment in which cleaning is to be performed. Techniques such as sand blasting (an example of a physical cleaning process) and acid etching (example of a chemical process) may be employed.

In step 430, a precursor chemical compound is applied to the surface. The choice of precursor compound depends on the coating material sought to be obtained in the steps below. The precursor chemical compound can be in any form (liquid, slurry, powder, etc., as described above), and the application approach depends on various factors such as the form in which the chemical compound is being applied.

In step 450, the desired coating is formed by subjecting the surface, to which the precursor chemical compound has been applied, to a rapid thermally activated chemical reaction process. The coating is derived from the precursor chemical by the rapid chemical reaction it undergoes at the elevated temperatures attained in the ambient employed. Approaches such as those based on furnaces, laser beams, halogen lamps can be used for the rapid attainment of high temperature required for conducting the chemical reaction process, as described in sections above.

In step 470, steps 430 and 450 may be repeated several times to obtain a desired thickness of coating. The method ends in step 499. Thus, an aspect of the present invention provides a coating method that combines the advantages (e.g., high rate and cost-effective deposition) of chemical methods, leaving the substrate intact at the end of the process, despite the elevation of temperature-that might be necessary or desirable.

6. Conclusion

While various embodiments of the present invention have been described above, it should be understood that they have been presented by way of example only, and not to imply any limitation. Thus, the breadth and scope of the present invention should not be limited by any of the exemplary embodiments described above, but should be defined only in accordance with the following claims and their equivalents.

What is claimed is:

1. A method of manufacturing a grid structure used in a battery, said method comprising:

coating a substrate with a metal compound, wherein said substrate is previously coated with a metal layer and a lead/lead alloy layer, wherein said substrate is made of material having a melting point; and subjecting said substrate coated with said metal compound to a rapid thermally activated chemical reaction process in which temperature is raised quickly to a first value and lowered to form an electrically conducting and corrosion-resistant metal compound layer on said lead/lead alloy layer, wherein said melting point is lower than said first value, wherein said metal compound comprises tin, and said electrically conducting and corrosion-resistant metal compound layer comprises tin oxide.

2. The method of claim 1, wherein said rapid thermally activated chemical reaction process does not affect the chemical/mechanical integrity of said substrate made of material having said melting point.

3. The method of claim 1, wherein said first value is greater than the melting point of lead-lead alloy wherein said rapid thermally activated chemical reaction process is designed to cause said electrically conducting and corrosion-resistant metal compound layer to be formed, without melting either the lead/lead alloy layer or said substrate made of material having said melting point.

4. The method of claim 3, wherein said metal compound is provided in the form of a solution or a slurry.

5. The method of claim 3, wherein said metal compound comprises tin, and said electrically conducting and corrosion-resistant metal compound layer comprises tin oxide.

6. The method of claim 3, wherein said subjecting comprises one of using a set of halogen lamps, using a furnace or using a laser beam.

7. The method of claim 3, wherein said coating of the substrate with said metal compound and said rapid thermally activated chemical reaction process are performed a plurality of times to achieve said protective layer of a desired thickness.

8. The method of claim 1, wherein said lead/lead alloy has a second melting point which is also lower than said first value.

9. The method of claim 8, wherein said melting point is less than 300 degrees celcius.

10. The method of claim 9, wherein said first value is in the range of 450 to 600 degrees celsius.

11. The method of claim 10, wherein said melting point is less than 175 degrees celsius.

12. The method of claim 11, wherein said substrate is made from a material having a mass density of less than 2.5 grams cm-3.

13. The method of claim 12, wherein said material comprises a polymer.

14. The method of claim 13, wherein said polymer comprises plastic.

15. The method of claim 14, wherein said metal layer is not more than 10 micrometers in thickness, said lead/lead alloy layer is not more than 100 micrometers in thickness, and said protective layer is not more than 15 micrometers in thickness.

16. The method of claim 15, wherein said electrically conductive and corrosion-resistant layer comprises $SnO_x$, wherein x represents a number between 1 and 2.0.

17. The method of claim 13, wherein the temperature in said rapid thermally activated chemical reaction process is raised at a rate of 10–50° per second.

* * * * *